Patented Feb. 5, 1929.

1,701,234

UNITED STATES PATENT OFFICE.

HANS HAHL, OF ELBERFELD, NEAR COLOGNE-ON-THE-RHINE, GERMANY, ASSIGNOR TO WINTHROP CHEMICAL COMPANY, INC., OF NEW YORK, N. Y.

COMPLEX ANTIMONY COMPOUND.

No Drawing. Application filed February 10, 1927, Serial No. 167,365, and in Germany April 22, 1926.

The present invention is a further development of my copending U. S. Patent 1,628,838 and my co-pending application Ser. No. 140,420 filed on October 8, 1926, which protect the manufacture of complex antimony compounds. The process therein described consists in causing interaction of the antimonyl compounds of such polyphenols as contain two hydroxyl groups in the ortho-position to one another, or of their substitution products with the neutral salts of such carboxylic acids as contain in the molecule hydrogen atoms which migrate easily on account of the proximity of acid groups, or alternatively with the neutral salts of aliphatic oxy acids.

As a result of further investigation, it has now been ascertained that instead of the neutral salts of the above carboxylic acids containing hydrogen atoms, which can easily migrate or instead of aliphatic oxy acids there can be employed the neutral salts of carboxylic acids and sulphonic acids of such polyphenols as contain two hydroxyl groups in the ortho-position to each other, as for example, gallic acid, gallo-carboxylic acid, pyrocatechin disulphonic acid, 2.3-dioxynaphthalene disulphonic acids and the like.

The new compounds are solid substances which are easily soluble in water and the aqueous solutions of which do not exert any irritant action and can be sterilized at 100° C. Mineral acids first cause precipitation, dissolved in excess of acid. The new compounds are excellent trypanocides.

The folowing examples serve to illustrate my invention:—

*Example 1.*—4.8 parts by weight of caustic soda are dissolved in 200 parts of water and 20 parts by weight of gallic acid are added. After the addition of a suspension of 30 parts by weight of antimonyl pyrocatechin in 200 parts of water, the reaction mixture is heated for some time, whereby the greater part of the antimonyl pyrocatechin passes into solution, exhibiting an acid reaction towards litmus. After neutralization with sodium carbonate the new complex antimony compound is precipitated with acetone. After redissolving and precipitating it is obtained in the form of an almost colorless powder, which dissolves in water giving an almost neutral reaction. The aqueous solution possesses good stability and is precipitated by alkaline sulfides. The content of antimony of the new compound amounts to 21 to 22 per cent and its probable formula is as follows:—

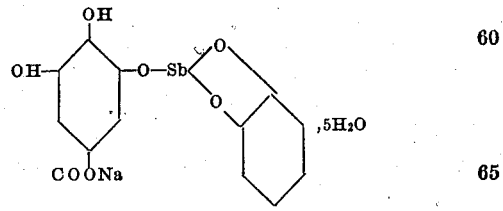

*Example 2.*—20 parts by weight of pyrocatechin disulfonic acid are dissolved with 250 parts of water and 3.5 parts by weight of caustic soda to a clear neutral solution. After the addition of 20 parts by weight of antimonyl pyrocatechin the reaction mixture is heated for some time and after filtration from any insoluble matter the solution is poured into alcohol, when the new complex antimony compound is precipitated. After filtration and drying it represents a slightly colored powder, which is easily soluble in water and has an antimony content of approximately 17 to 18 per cent.

I claim:—

1. The process which comprises causing antimonyl-pyrocatechin of the probable formula:

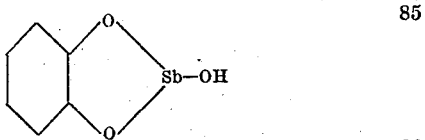

to be reacted upon by a neutral alkali salt of a carboxylic acid of such a polyphenol as contains hydroxyl groups in ortho-position to each other.

2. The process which comprises heating antimonyl-pyrocatechin of the probable formula:

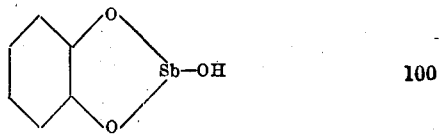

together with a neutral alkali salt of gallic acid in aqueous solution, neutralizing with sodium carbonate and precipitating the reaction product with acetone.

3. As new products compounds of the general formula:

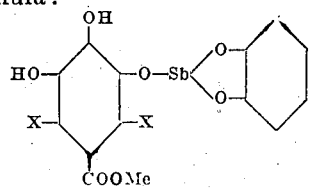

wherein X represents hydrogen, but one X may be the carboxylic acid group, Me represents an alkali metal, said products being excellent trypanocides which are easily soluble in water and may be sterilized at 100° C. without decomposition.

4. As a new product the compound of the formula:

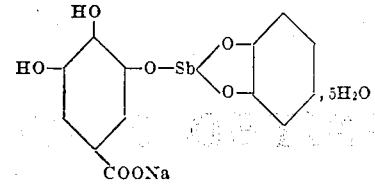

said product being an excellent trypanocide, forming in the dry state an almost colorless powder easily soluble in water, which solution may be sterilized at 100° C. without decomposition.

In testimony whereof, I affix my signature.

HANS HAHL.